UNITED STATES PATENT OFFICE.

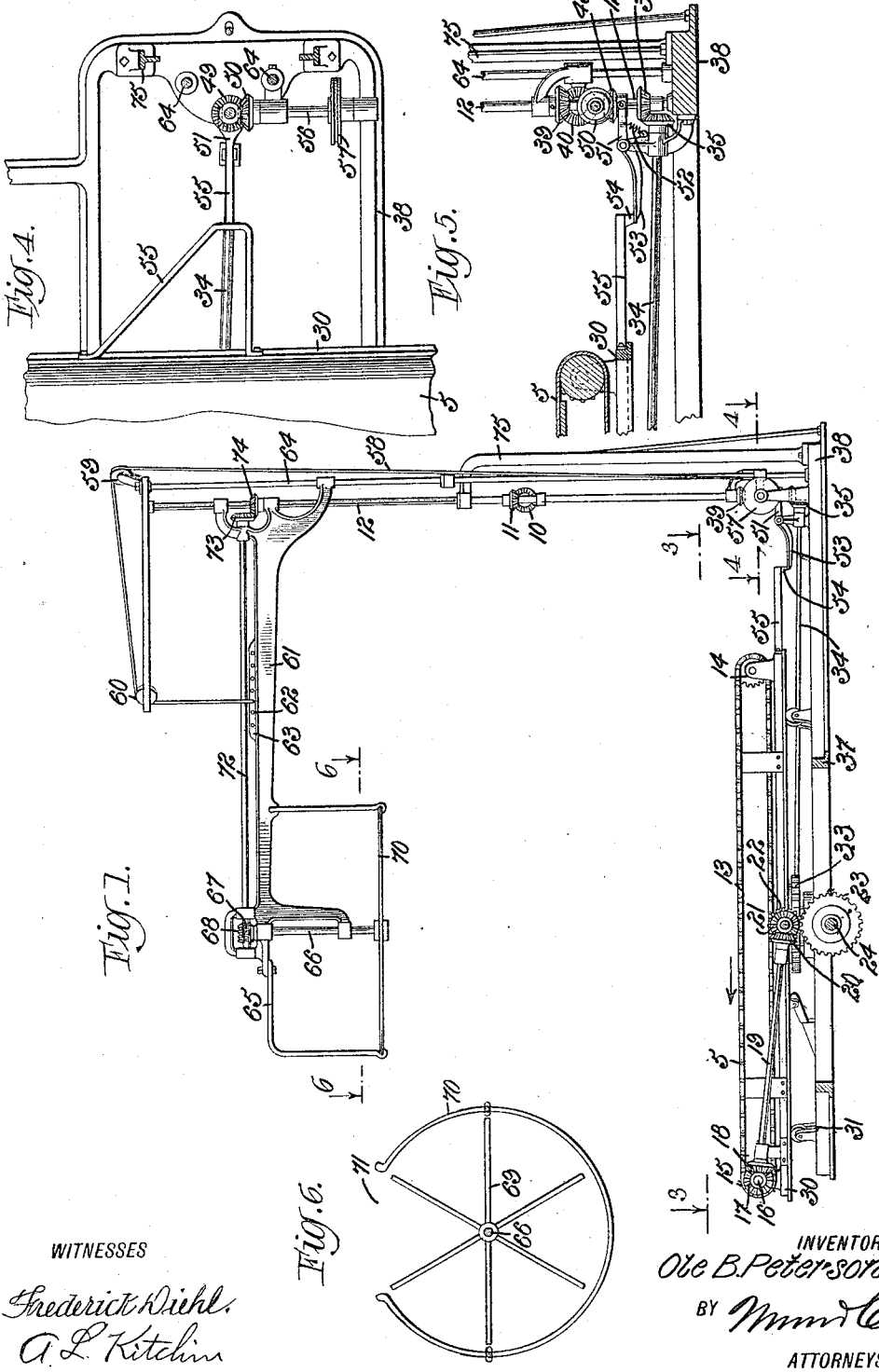

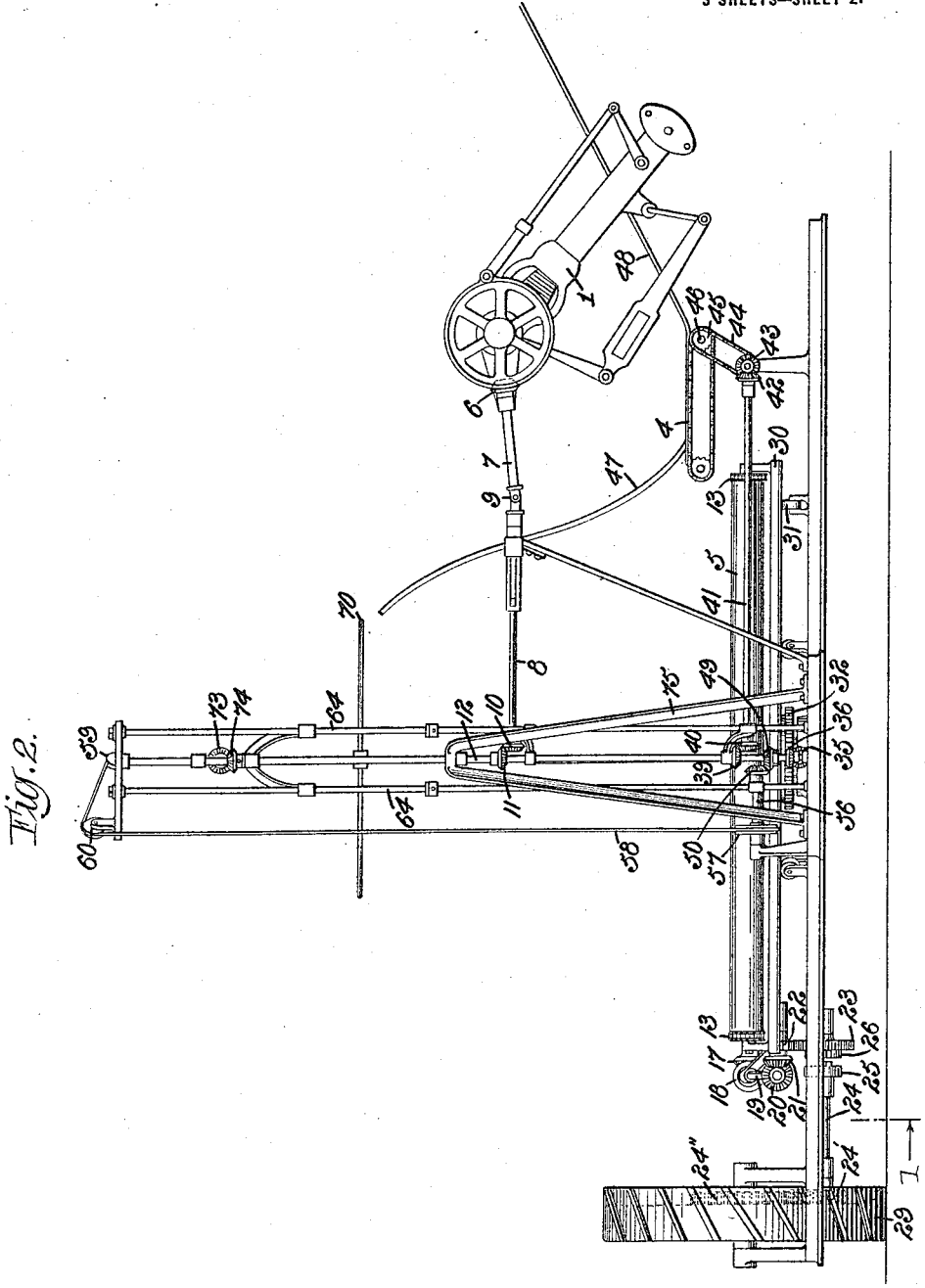

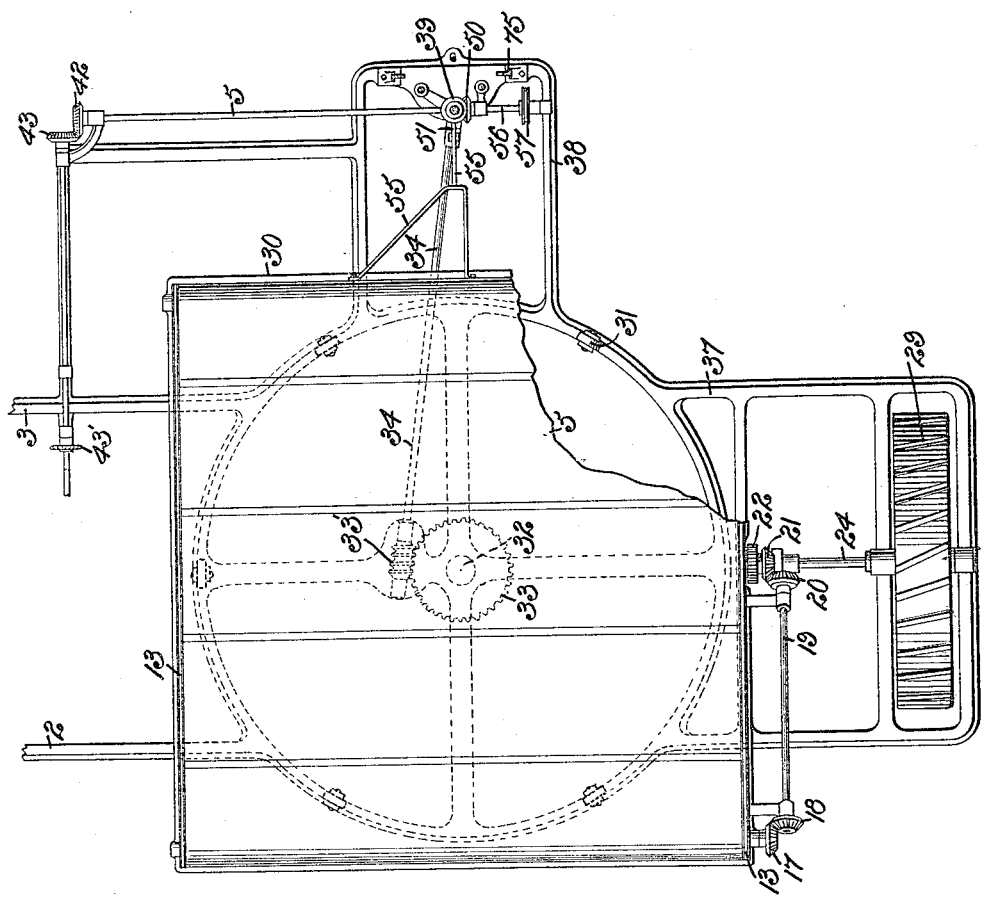

OLE B. PETERSON, OF JACKSON, MINNESOTA.

GRAIN-SHOCKER.

1,214,215.  Specification of Letters Patent.  Patented Jan. 30, 1917.

Application filed June 28, 1916. Serial No. 106,320.

*To all whom it may concern:*

Be it known that I, OLE B. PETERSON, a citizen of the United States, and a resident of Jackson, in the county of Jackson and State of Minnesota, have invented a new and Improved Grain-Shocker, of which the following is a full, clear, and exact description.

This invention relates to grain shockers and has for an object the provision of an improved arrangement adapted to be connected to any suitable harvesting machine so that the bundles in the harvesting machine may be accumulated on a suitable platform and then discharged in a proper upright position.

Another object in view is to provide a platform to be connected to a harvesting machine which is formed with an intermittently traveling belt and means for assembling the bundles of grain on the belt and then discharging the same at a given time.

A still further object of the invention is to provide a shocking device which receives the bundles successively until a predetermined number have been gathered together and then moved rearwardly at the same speed as the device moves forwardly so that the entire assemblage of bundles will be discharged in an upright position.

In the accompanying drawings: Figure 1 is a sectional view through Fig. 2 on line 1—1. Fig. 2 is a front view of a complete device shown connected to a harvester. Fig. 3 is a sectional view through Fig. 1 on line 3—3, certain parts being broken away. Fig. 4 is an enlarged detail fragmentary sectional view through Fig. 1 on line 4—4. Fig. 5 is a side view of the structure shown in Fig. 4. Fig. 6 is a detail fragmentary sectional view through Fig. 1 on line 6—6. Fig. 7 is a side view of a clutch mechanism embodying certain features of the invention. Fig. 8 is a section through Fig. 7 on line 8—8.

Referring to the accompanying drawings by numerals, 1 indicates part of the tying mechanism and associated parts of a harvesting machine to which a shocker is attached, such attachment being in any suitable way, as for instance, by having the bars 2 and 3 bolted or otherwise suitably connected to the harvester. The tying mechanism and associated parts 1 form no part of the present invention, but a traveling member 4 is provided for causing the bundles which are successively tied and discharged to be discharged on belt 5 in an upright position and, also, power is conveyed from the tying mechanism to the pinion 6, to shaft 7 and from thence to shaft 8 through the universal connection 9 so that shaft 8 may rotate and in turn rotate the gear 10 meshing with gear 11 connected to rod 12. Power transmitted in this manner to the rod 12 will intermittently move said rod in timed relationship to the movement of the tying mechanism 1.

The belt 5 is connected to a chain 13 on each edge, which chains pass over suitable sprockets 14 and 15 at the respective ends, sprockets 14 being preferably idlers while sprockets 15 are preferably connected by a shaft 16 to which the beveled gear 17 is rigidly secured, said beveled gear meshing with beveled gear 18 connected to rod 19. In order to properly support the belt 5 a roller is provided between the respective sprockets 14 and the sprockets 15. Rod 19 is connected with a beveled gear meshing with beveled gear 21, the last mentioned beveled gear being rigidly connected with a spur gear 22, which spur gear meshes with a gear 23. The gear 23 is loosely mounted on shaft 24, said shaft carrying a clutch 25 adapted to engage whenever desired with the clutch face 26 extending from the gear 23, said clutch and clutch face being normally held in engagement by a suitable spring 27. As shown in Fig. 7, the clutch face 26 is provided with a comparatively large opening 28 so that there will be a slight loose motion between the parts, and in taking up this loose motion the shaft 24 and clutch 25 must wind spring 27 which in turn relieves the sudden jerk or jar of rotating the gear wheel 23. By this construction and arrangement the belt 5 rotates continuously by reason of the rotation of the wheel 29 as long as the gear wheel 22 is in mesh with gear wheel 23, said rotation taking place after the proper number of bundles have been placed on the belt 5 and continuing until all of the bundles have been discharged. Shaft 24 has a pinion 24' connected thereto at the outer end which meshes with a gear 24" secured to the wheel 29, these gears being of proper size to produce a proper speed on the apron when gears 22 and 23 are meshing.

The belt 5 is mounted upon a platform 30 which rotates and, consequently, the gear wheel 22 is only in mesh with gear wheel 23 for a short time. The platform 30 is supported by a plurality of rollers 31 and has a pivotal pin 32 rigidly connected therewith, which pin has rigidly connected thereto a driving gear 33 preferably of the worm wheel type so as to mesh with the worm 33' on shaft 34. Shaft 34 carries a beveled pinion 35 (Fig. 5) which meshes with a beveled gear 36 keyed or otherwise rigidly secured to shaft 12. Shaft 12 is rotated by beveled gears 10 and 11 driven from the tying mechanism of the harvester so that power will be transmitted to the platform 30 for rotating the same intermittently, said rotation occurring during the tying and discharging movement of the bundle. The platform 30 is mounted on the frame 37, which frame carries wheel 29 and which frame is also provided with the extensions 2 and 3 as well as a suitable extension 38 carrying shaft 12 and associated parts. A beveled gear wheel 39 is rigidly connected with shaft 12 above the beveled gear 36, gear 39 meshing with a gear 40 rigidly secured to shaft 41, which shaft carries a second beveled gear 42 meshing with beveled gear 43. Beveled gear 43 carries a sprocket 43' over which chain 44 passes, said chain also passing over a sprocket 45 rigidly connected with shaft 46, said shaft carrying suitable sprockets on which the chain belt 4 is mounted. This chain belt is arranged adjacent the members 47 and 48 which receive and guide the bundles from the harvesting machine to the belt or apron 5.

Slidingly positioned on shaft 12 between the gear wheels 36 and 39 is a beveled gear 49 adapted to mesh with beveled gear 50, gear 49 being connected with a pivotally mounted lever 51 continually urged by spring 52 to move downwardly or out of mesh with gear 50. The lever 51 is provided with an extension 53 adapted to be moved downwardly by the projection 54 on bracket 55 connected to the platform 30. The parts are so arranged that when the gear wheel 22 reaches the gear wheel 23 and begins to mesh therewith the lug 54 will engage the extension 53 of lever 51 and depress the same so that gear wheel 49 will be brought into mesh with gear wheel 50, whereupon the shaft 56 will be rotated and will rotate the pulley 57 which carries a cable 58, one end of said cable being preferably rigidly secured to said pulley so as to insure the movement of the cable. Cable 58 passes upwardly to the top of the machine over guiding pulleys 59 and 60 and is connected to arm 61 in any suitable way, as for instance, by being passed over some of the apertures 62 in the projection 63. A pull upon the cable 58 will cause the arm 61 to be raised the same sliding on shaft 12 and guiding rods 64.

Arm 61 carries at its outer or free end a shocking mechanism 65 which surrounds the upper part of the various bundles and holds the same together. When the cable 56 is moved the shocking mechanism is elevated a sufficient distance to be freed from the bundles and, consequently, will not interfere with the movement of the apron or belt 50. It will be observed that the shocking mechanism 65 is not moved until the belt or apron is about to move and, consequently, holds the shock in the proper position until it is discharged. As the belt or apron 5 is caused to move at the same speed as the device is traveling the shock will be deposited on the ground in an upright position. The shocking mechanism 65 comprises a shaft 66 journaled in the outer end of arm 61 and carries a worm gear 67 meshing with worm 68 whereby the shaft 66 may be rotated, said shaft carrying a plurality of spokes 69, the space between the spokes being adapted to receive the bundles. A guard ring 70 is provided which is formed with an opening 71, said opening facing the harvester so that the bundle discharged through the harvester may pass through the opening into the space between the two spokes spanning the opening. In constructing the shocking mechanism 65 shaft 66 may be of any suitable kind and is raised vertically in suitable bearings in the arms 61 so as to properly rotate the spokes 69 which are connected thereto and spaced apart for receiving the bundles as heretofore described. These spokes are preferably of about the same thickness as the ring 70 and are preferably normally arranged in the same horizontal plane as said ring when the bundles are being placed in position but are moved upwardly therefrom when the complete shock is to be discharged. In regard to the ring 70 it will be noted that the same is supported by suitable members connected with the arm 61 so as to be held rigidly in position to be raised and lowered with the arm. Upon the tying of the next knot the bundle just mentioned will be moved for a short distance by reason of the rotation of the platform 30 and the rotation of the spokes 69, the rotation of these members being simultaneous and to the same extent. The worm 68 for rotating the shaft 66 and spokes 69 is operated by power received from the shaft 72, which shaft carries a beveled gear 73 meshing with beveled gear 74 splined on the shaft 12. Shaft 12 is properly supported by a suitable bracket or bracing member 75 secured to the frame 37 in any suitable manner.

As shown in Fig. 2 a conventional tying mechanism has been disclosed, as this forms no part of the present invention and is shown merely to illustrate how the parts may be connected up with any suitable tying mechanism and receive an intermittent motion therefrom to provide a proper motion to the moving parts of the device. It is evident that after the tying mechanism has completed its knot the wheel with which the pinion 6 meshes is operated for catching the bundle and when this wheel is operated the parts of the device are operated in timed relation thereto. It will be observed that by connecting the moving parts of the invention to the tying mechanism, as for instance to the gear wheel which rotates when the bundle is ejected, the movable platform 30 and other parts will not be operated until the proper number of bundles has been placed thereon. In harvesting different fields of grain sometimes the grain is thick and, consequently, the bundles will be supplied at short distances apart, whereas in other places the grain is not so thick and the bundles will be supplied at long distances apart. By connecting the mechanism for rotating the platform 30 and shocking device 65 to the ejecting mechanism of the tying device these parts will wait until a bundle has been ejected before operating even if the distance is great.

What I claim is:

1. In a grain shocking device of the character described, the combination with a harvesting machine, of a frame connected to said machine, a rotatable member for receiving bundles from said machine, means for connecting the bundle ejecting mechanism of the harvesting machine with said member so that the two mechanisms will move together, means for holding the bundles in an upright position, an endless belt on said rotatable member for causing the ejection of the shock after the same has been formed, and means for operating said belt upon each revolution of said rotatable member.

2. In a grain shocking device of the character described, an endless belt, a rotatable platform carrying said belt, means for intermittently rotating said platform, and means for moving said belt at predetermined intervals so as to discharge bundles deposited thereon.

3. In a grain shocking device of the character described, the combination with a harvester, of a traveling belt for receiving bundles from said harvester, means for holding the bundles upright on said belt, a rotatable platform carrying said belt, means operated by said harvester for intermittently rotating said platform whereby the bundles discharged from the harvester on to the belt will be moved to one side until the platform has made a complete revolution, and means for moving said belt upon each complete rotation of said platform so as to discharge the bundles positioned thereon, said means causing the platform to operate at a speed equal to the speed of advance of the harvesting machine whereby said bundles will be maintained in an upright position.

4. In a grain shocking machine of the character described, a belt for receiving bundles one at a time, rotatable means for holding said bundles in an upright position, a rotatable platform carrying said belt, means operated by the same power shaft for rotating the means for holding the bundles upright and also said platform in order that the bundles placed on the belt may be moved out of the way of the incoming or new bundles, means for moving said belt including a gear wheel, and means for rotating said gear wheel, said means including a traction wheel and a driving gear, said driving gear and the first mentioned gear meshing when said rotatable platform has been turned to a predetermined position.

5. In a grain shocking device of the character described, a frame adapted to be connected to a harvesting machine, a rotatable platform arranged on said frame, a traction wheel arranged at one side of said frame, a traveling belt arranged on said rotatable platform, a worm and gear drive for rotating said platform, a bundle or shock holder arranged above the platform for holding the bundles in an upright position as they are gathered on said belt, a worm and gear drive for rotating said bundle or shock holder, a rotatable shaft geared to both of said worms for operating the same simultaneously whereby the shock holder and the platform will rotate at the same speed and to the same extent, means for connecting said shaft to said harvester so as to receive power therefrom intermittently, and means for connecting said traction wheel with said belt upon each revolution of said platform whereby the bundles on the belt will be discharged therefrom.

6. In a shocking device for grain, an endless belt for receiving bundles of grain, a rotatable platform, belt carrying rolls on said platform for supporting said belt, means for moving said belt about its carrying rolls including a gear wheel carried by the platform, a fixed driving gear arranged in the path of movement of the first mentioned gear wheel whereby upon each revolution of the platform said gears will be brought into mesh and said belt will be moved a predetermined distance for discharging the bundles arranged thereon, and traction means connected with said second mentioned gear for driving the same.

7. In a shocking device of the character described, a frame adapted to be connected with a harvesting machine, a rotatable platform arranged in said frame, means for intermittently rotating said platform, a belt arranged on said platform, means for operating said belt upon each revolution of said platform, a rotatable bundle holder arranged above said belt, and means for elevating said bundle holder upon the beginning of the movement of said belt, said means comprising a lifting cable, means for guiding said lifting cable, a pulley for moving said cable, means for connecting said pulley with the means for intermittently rotating said platform, a lever for shifting said connecting means, and a depressing member carried by said platform for operating said lever upon each revolution of the platform.

8. In a device of the character described, a belt for receiving bundles from a harvesting machine, a rotatable platform carrying said belt, a rotatable bundle support arranged above the belt, an upright power shaft, means for connecting said power shaft with the bundle ejecting mechanism of said harvesting mechine whereby the power shaft will be intermittently rotated, means for connecting said power shaft with said bundle support and said platform so as to intermittently rotate these members simultaneously, and means for moving said belt a predetermined distance upon each revolution of said platform so as to discharge the bundles arranged on the belt.

9. In a shocking device for grain, a frame adapted to be connected to a harvester, a belt for receiving bundles from said harvester, a holder for the upper part of said bundles, said holder comprising a wheel having spokes for holding in position said bundles, said bundles being adapted to be discharged into the space between the respective spokes, a ring surrounding said wheel except for the space between two spokes, means for rotating said wheel and the belt simultaneously step by step, and means for causing said belt to discharge the bundles thereon upon each complete revolution thereof.

10. In a grain shocking device of the character described, a belt for receiving bundles of grain, a rotatable platform carrying said belt, a bundle holding device arranged above the center of said belt, means for causing said platform and said bundle holder to rotate step by step simultaneously, a vertically movable arm carrying said bundle holding member, means for raising said arm so that the bundle holding member will be moved out of engagement with said bundle upon the completion of each revolution of said platform, and means for moving said belt independently of the platform upon the completion of each revolution of the platform whereby the bundles arranged thereon are discharged.

OLE B. PETERSON.

Copies of this patent may be obtained for five cents each, by addressing the "Commissioner of Patents, Washington, D C."